US011563814B2

(12) United States Patent
Yamato et al.

(10) Patent No.: US 11,563,814 B2
(45) Date of Patent: Jan. 24, 2023

(54) SESSION CONTROL APPARATUS, SESSION CONTROL METHOD, AND PROGRAM

(71) Applicant: OMRON Corporation, Kyoto (JP)

(72) Inventors: Tetsuji Yamato, Yokohama (JP); Taiji Yoshikawa, Kizugawa (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/962,365

(22) PCT Filed: Nov. 29, 2018

(86) PCT No.: PCT/JP2018/043928
§ 371 (c)(1),
(2) Date: Jul. 15, 2020

(87) PCT Pub. No.: WO2019/159486
PCT Pub. Date: Aug. 22, 2019

(65) Prior Publication Data
US 2020/0382604 A1 Dec. 3, 2020

(30) Foreign Application Priority Data
Feb. 13, 2018 (JP) .............................. JP2018-022958

(51) Int. Cl.
*H04L 67/141* (2022.01)
*H04L 67/12* (2022.01)
*H04L 67/142* (2022.01)

(52) U.S. Cl.
CPC ............ *H04L 67/141* (2013.01); *H04L 67/12* (2013.01); *H04L 67/142* (2013.01)

(58) Field of Classification Search
CPC ..... H04L 67/12; H04L 67/142; H04L 67/141; H04L 63/1416; H04L 67/1095;
(Continued)

(56) References Cited

U.S. PATENT DOCUMENTS 4,780,826 A * 10/1988 Nakano ................. F02D 41/222
123/479
10,719,832 B1 * 7/2020 Leavitt ............... G06Q 20/4016
(Continued)

FOREIGN PATENT DOCUMENTS

EP 3392775 A1 10/2018
JP 2005-260914 A 9/2005
(Continued)

OTHER PUBLICATIONS

English translation of the International Search Report ("ISR") of PCT/JP2018/043928 dated Jan. 15, 2019.
(Continued)

*Primary Examiner* — George C Neurauter, Jr.
*Assistant Examiner* — Linh T. Nguyen
(74) *Attorney, Agent, or Firm* — Metrolex IP Law Group, PLLC

(57) ABSTRACT

A session control apparatus, a session control method, and a session control program may maintain a quality of input data output to a processing module. The processing module has a defined condition regarding a quality of the input data. The session control apparatus includes an extraction unit, a selection unit, and a switching unit. The extraction unit extracts a plurality of candidates of devices. The selection unit selects at least one device from the plurality of candidates of devices. The switching unit switches the device that outputs the input data to the processing module to the at least one device selected by the selection unit. Each of the plurality of candidates of devices outputs input data satisfying the condition.

14 Claims, 17 Drawing Sheets

(58) Field of Classification Search
CPC ............. H04L 63/1433; H04L 43/02; G06F 16/683; G06F 16/907; H04W 4/38; H04W 52/0229; G07C 5/0808; G07C 5/006; G07C 5/0816; F05D 2260/80
See application file for complete search history.

(56) References Cited

U.S. PATENT DOCUMENTS

| | | | |
|---|---|---|---|
| 2005/0144343 A1 | 6/2005 | Hamdan | |
| 2005/0267702 A1* | 12/2005 | Shah | G05B 23/0229 702/81 |
| 2008/0313362 A1* | 12/2008 | Takamoto | G06F 11/2038 710/19 |
| 2010/0305883 A1* | 12/2010 | Danzy | G06F 19/00 702/50 |
| 2012/0016607 A1* | 1/2012 | Cottrell | G05B 23/0229 702/62 |
| 2014/0201369 A1 | 7/2014 | Maeda et al. | |
| 2015/0245212 A1* | 8/2015 | Kawamura | G06Q 30/06 455/410 |
| 2015/0248275 A1* | 9/2015 | Gallo | G01T 7/00 702/189 |
| 2015/0334016 A1* | 11/2015 | Izawa | H04L 67/61 370/389 |
| 2016/0048399 A1* | 2/2016 | Shaw | G01D 1/18 718/1 |
| 2017/0089739 A1* | 3/2017 | Gallo | G08B 21/18 |
| 2017/0289738 A1* | 10/2017 | Jepson | H04W 4/00 |
| 2017/0353704 A1* | 12/2017 | Su | G09G 5/00 |
| 2018/0003572 A1* | 1/2018 | Garsd | G01K 3/14 |
| 2018/0157220 A1* | 6/2018 | Pan | G05D 1/08 |
| 2018/0248900 A1* | 8/2018 | Keshet | H04L 63/1425 |
| 2018/0297718 A1* | 10/2018 | Adibhatla | G07C 5/008 |
| 2018/0306609 A1* | 10/2018 | Agarwal | G01D 9/00 |
| 2019/0052676 A1* | 2/2019 | Giokas | H04W 12/08 |
| 2019/0099886 A1* | 4/2019 | Chattopadhyay | B25J 9/1674 |
| 2019/0129675 A1* | 5/2019 | Ochiai | G05B 23/0216 |
| 2019/0139396 A1* | 5/2019 | Cruver | H04W 12/08 |
| 2019/0163588 A1* | 5/2019 | Anders | G06F 11/2069 |
| 2019/0251258 A1* | 8/2019 | Walters | G06F 21/54 |
| 2020/0142390 A1* | 5/2020 | Hubauer | G01D 3/08 |
| 2020/0151199 A1* | 5/2020 | Nakamura | G06F 16/285 |
| 2020/0285997 A1* | 9/2020 | Bhattacharyya | |

FOREIGN PATENT DOCUMENTS

| | | |
|---|---|---|
| JP | 2011-28325 A | 2/2011 |
| JP | 2014-45242 A | 3/2014 |
| JP | 2017-111501 A | 6/2017 |
| WO | 2013/024672 A1 | 2/2013 |

OTHER PUBLICATIONS

Written Opinion("WO") of PCT/JP2018/043928 dated Jan. 15, 2019.
Japanese Office Action("JPOA") dated Jan. 8, 2019.
Japanese Office Action("JPOA") dated Feb. 26, 2019.

* cited by examiner

FIG. 5

Processing module metadata DB

| Processing module ID | Port number | Processing module metadata | | | | | | |
|---|---|---|---|---|---|---|---|---|
| | | Basic conditions | | | | Quality conditions | | |
| | | Class | Target | Location | ... | Outlier | Data dropout frequency | Manufacturer |
| M1 | 1 | Temp. sensor | Outside temp. | P1 | ... | ≤ 5% | ≤ 1% | Any |
| | 2 | Temp. sensor | Outside temp. | P2 | ... | ≤ 5% | ≤ 1% | Any |
| | 3 | Temp. sensor | Outside temp. | P3 | ... | ≤ 5% | ≤ 1% | Any |
| M2 | 1 | Camera | Station ticket gate | Any | ... | ≤ 0.1% | ≤ 0.1% | Company O or P |
| | 2 | Illumination sensor | Illumination | Any | ... | ≤ 0.1% | ≤ 0.1% | Excluding company M |
| | 3 | Temp. sensor | Temperature | Any | ... | ≤ 0.1% | ≤ 0.1% | Company O or P |
| ... | ... | ... | ... | ... | ... | ... | ... | ... |

| ID | Basic attributes | | | | Quality attributes | | | |
|---|---|---|---|---|---|---|---|---|
| | Class | Target | Location | ... | Outlier frequency | Data dropout frequency | Manufacturer | ... |
| X1 | Temp. sensor | Outside temp. | P1 | ... | ≤ 5% | ≤ 1% | Company O | ... |

Sensor metadata DB

| Sensor ID | Sensor metadata ||||||||
| | Basic attributes |||| Quality attributes |||
| | Class | Target | Location | ... | Outlier frequency | Data dropout frequency | Manufacturer | ... |
| 1 | Temp. sensor | Outside temp. | P1 | ... | ≤ 5% | ≤ 1% | Company O | ... |
| 2 | Camera | Station ticket gate | P2 | ... | ≤ 0.1% | ≤ 0.1% | Company P | ... |
| 3 | Illumination sensor | Illumination | P3 | ... | ≤ 0.1% | ≤ 0.1% | Company M | ... |
| 4 | Temp. sensor | Temperature | P4 | ... | ≤ 0.1% | ≤ 0.1% | Company O | ... |
| ... | ... | ... | ... | ... | ... | ... | ... | ... |

230

SESSION CONTROL APPARATUS, SESSION CONTROL METHOD, AND PROGRAM

FIELD

The present invention relates to a session control apparatus, a session control method, and a session control program.

BACKGROUND

Japanese Unexamined Patent Application Publication No. 2014-45242 (Patent Literature 1) describes a virtual sensor generation apparatus that generates a virtual sensor. This virtual sensor generation apparatus detects a real sensor located within a predetermined range and generates a virtual sensor using the detected real sensor (refer to Patent Literature 1).

CITATION LIST

Patent Literature

Patent Literature 1: Japanese Unexamined Patent Application Publication No. 2014-45242

SUMMARY

Technical Problem

The virtual sensor described in Patent Literature 1 includes, for example, a real sensor (an example of a device) and a processing module. The processing module processes sensing data (an example of input data) output from the real sensor to generate output data different from the input data. For the virtual sensor to function continuously, for example, the quality of input data output to the processing module is to be maintained. However, Patent Literature 1 does not describe any method for maintaining the quality of input data output to a processing module.

In response to the above issue, one or more aspects of the present invention are directed to a session control apparatus, a session control method, and a session control program for maintaining the quality of input data output to a processing module.

Solution to Problem

A session control apparatus according to one aspect of the present invention is an apparatus for controlling a session between a processing module and a device that outputs input data to the processing module. The processing module generates, based on at least one piece of the input data, output data different from the at least one piece of input data. The processing module has a defined condition regarding a quality of the input data. The session control apparatus includes an extraction unit, a selection unit, and a switching unit. The extraction unit extracts a plurality of candidates of devices. The selection unit selects at least one device from the plurality of candidates of devices. The switching unit switches the device that outputs the input data to the processing module to the at least one device selected by the selection unit. Each of the plurality of candidates of devices outputs input data satisfying the condition.

This session control apparatus extracts candidates of devices that output input data satisfying the quality condition, and switches the device that outputs input data to the processing module to any of the extracted devices. The session control apparatus thus allows input of data satisfying the quality condition from the switched device and can maintain the quality of input data output to the processing module.

In the above session control apparatus, the switching unit may switch, when the input data input into the processing module fails to satisfy the condition, the device that outputs the input data to the processing module to the at least one device selected by the selection unit.

When input data input into the processing module fails to satisfy the quality condition, this session control apparatus switches the device that outputs input data to the processing module to the device that outputs input data satisfying the quality condition. Thus, the session control apparatus stops input of data failing to satisfy the quality condition and can maintain the quality of input data output to the processing module.

In the above session control apparatus, the devices may be sensors. The input data may be sensing data generated by the sensors.

In the above session control apparatus, the processing module may generate the output data based on a plurality of pieces of the input data.

In the above session control apparatus, the processing module and the device that outputs the input data to the processing module may form a virtual sensor.

A session control apparatus according to another aspect of the present invention is an apparatus for controlling a session between a processing module and a storage storing a data set to be input into the processing module. The data set includes a plurality of pieces of data. The processing module generates, based on at least one piece of input data, output data different from the at least one piece of input data. The processing module has a defined condition regarding a quality of the at least one piece of input data. The session control apparatus includes an extraction unit, a selection unit, and a switching unit. The extraction unit extracts a plurality of data set candidates. The selection unit selects at least one data set from the plurality of data set candidates. The switching unit switches the data set to be input into the processing module to the at least one data set selected by the selection unit. Data included in each of the plurality of data set candidates satisfies the condition.

This session control apparatus extracts input candidates for data sets that satisfy the quality condition and switches the data set to be input into the processing module to any of the extracted data sets. The session control apparatus thus allows input of a data set satisfying the quality condition and can maintain the quality of input data output to the processing module.

A session control method according to still another aspect of the present invention is a method for controlling a session between a processing module and a device that outputs input data to the processing module. The processing module generates, based on at least one piece of the input data, output data different from the at least one piece of input data. The processing module has a defined condition regarding a quality of the input data. The session control method includes extracting a plurality of candidates of devices, selecting at least one device from the plurality of candidates of devices, and switching the device that outputs the input data to the processing module to the at least one device selected by the selection unit. Each of the plurality of candidates of devices outputs input data satisfying the condition.

This session control method extracts candidates of devices that output input data satisfying the quality condition and switches the device that outputs input data to the processing module to any of the extracted devices. The session control method thus allows input of data satisfying the quality condition from the switched device and can maintain the quality of input data output to the processing module.

A program according to still another aspect of the present invention causes a computer to implement controlling a session between a processing module and a device that outputs input data to the processing module. The processing module generates, based on at least one piece of the input data, output data different from the at least one piece of input data. The processing module has a defined condition regarding a quality of the input data. The program causes the computer to implement extracting a plurality of candidates of devices, selecting at least one device from the plurality of candidates of devices, and switching the device that outputs the input data to the processing module to the at least one device selected by the selection unit. Each of the plurality of candidates of devices outputs input data satisfying the condition.

This program is executed by the computer to extract candidates of devices that output input data satisfying the quality condition and to switch the device that outputs input data to the processing module to any of the extracted devices. The program thus allows input of data satisfying the quality condition from the switched device and can maintain the quality of input data output to the processing module.

Advantageous Effects

The session control apparatus, the session control method, and the session control program according to the aspects of the present invention can maintain the quality of input data output to the processing module.

BRIEF DESCRIPTION OF THE DRAWINGS

FIG. 5 is a table showing an example processing module metadata DB.

FIG. 9 is a table showing example metadata associated with sensing data.

FIG. 12 is a table showing an example sensor metadata DB.

DETAILED DESCRIPTION

Figure 1:
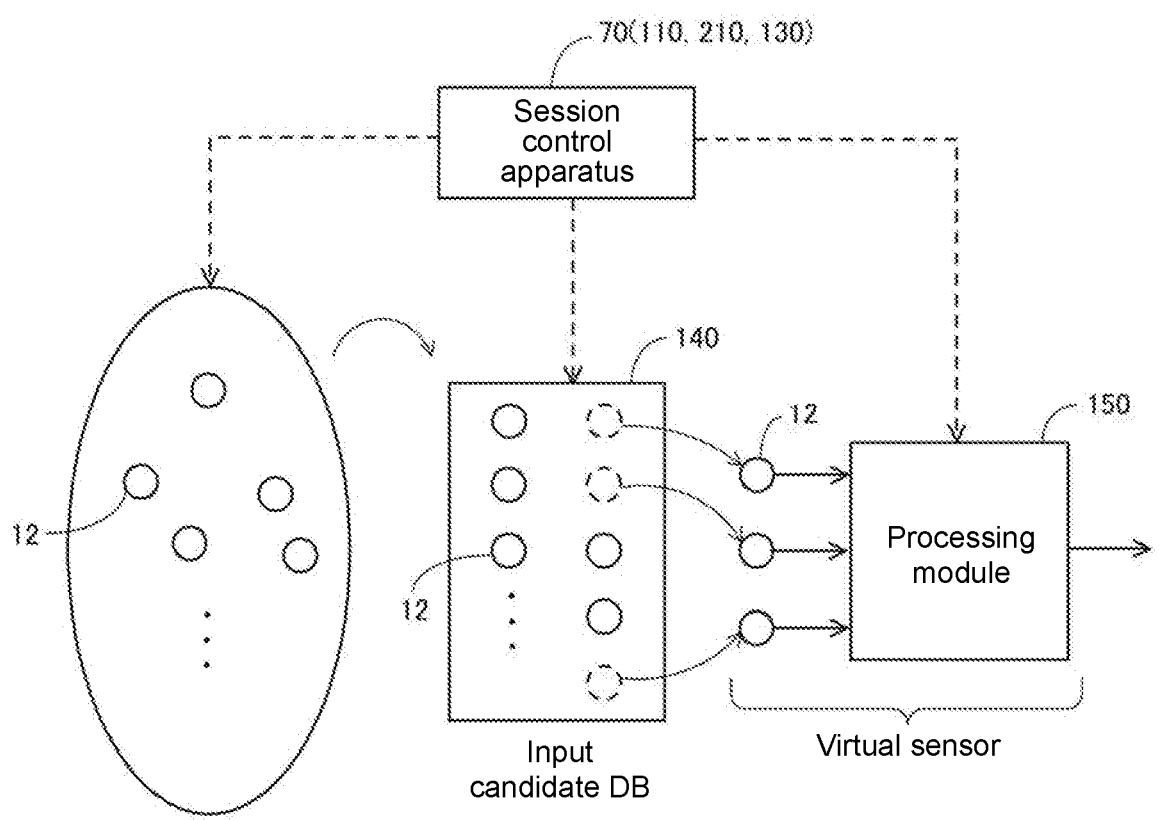
FIG. 1 is a schematic diagram of a session control apparatus 70.

One or more embodiments of the present invention (hereafter, the present embodiment) will now be described in detail with reference to the drawings. The same or corresponding components in the figures are given the same reference numerals, and will not be described repeatedly. The present embodiment described below is a mere example of the present invention in all aspects. The present embodiment may be variously modified or altered within the scope of the present invention. More specifically, the present invention may be implemented as appropriate using any configuration specific to each embodiment.

1. Overview

FIG. 1 is a schematic diagram of a session control apparatus 70 according to the present embodiment. Referring to FIG. 1, a processing module 150 includes multiple input ports. Each input port receives sensing data (an example of input data) output from a real sensor 12 (an example of a device). Based on input data, the processing module 150 generates output data different from the input data. In other words, the processing module 150 and the real sensors 12 (input sensors) that output input data to the processing module 150 form a virtual sensor. The virtual sensor is a sensor module that outputs, based on sensing data resulting from the input sensor observing a target, the observation results of a target different from the target observed by the input sensor as sensing data. The virtual sensor will be described in detail later.

For the virtual sensor to function continuously, the quality of input data output to the processing module 150 is to be maintained. In other words, when input data with a lower quality is output to the processing module 150, the virtual sensor may not have an intended function.

The session control apparatus 70 according to the present embodiment extracts, in advance, candidates (hereafter also referred to as input sensor candidates) for the real sensors 12 that output input data to the processing module 150. More specifically, the session control apparatus 70 extracts, in advance, from multiple real sensors 12 with which the session control apparatus 70 can communicate through a network, real sensors 12 suitable for input sensors for the processing module 150, and manages the extracted real sensors 12 in an input candidate database (DB) 140. More specifically, each real sensor 12 managed in the input candidate DB 140 can output data satisfying quality conditions of input data output to the processing module 150.

The session control apparatus 70 according to the present embodiment selects at least one or all of the multiple real sensors 12 managed in the input candidate DB 140 and switches the input sensor for the processing module 150 to at least one of the selected real sensors 12 as appropriate. The session control apparatus 70 allows output of input data satisfying the quality conditions from the switched real sensor 12 and can thus maintain the quality of input data output to the processing module 150. The specific configuration and operations will be described one after another.

2. Example Configuration

2-1. Example Configuration of Entire System

Figure 2:
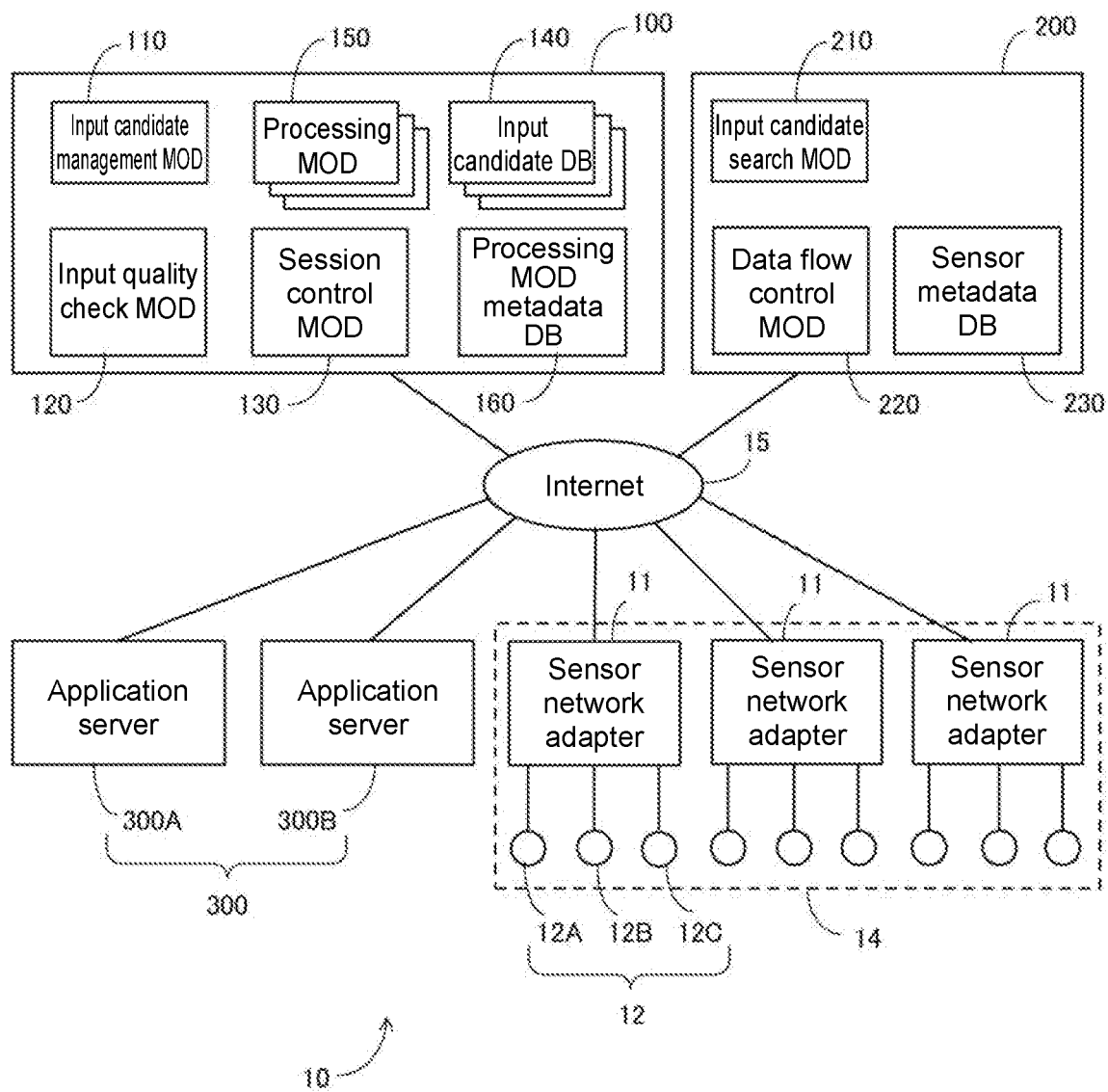
FIG. 2 is a diagram showing an example sensor network system.

FIG. 2 is a diagram showing an example sensor network system 10 including the session control apparatus 70 (FIG. 1) according to the present embodiment. In the example in FIG. 2, the sensor network system 10 includes a sensor network unit 14, a virtual sensor management server 100, a sensing data trading market (SDTM) server 200, and application servers 300. In the present embodiment, the session control apparatus 70 is implemented by the virtual sensor management server 100 and the SDTM server 200.

The sensor network unit 14, the virtual sensor management server 100, the SDTM server 200, and the application servers 300 are connected to one another through the Internet 15 to allow communication between them. The sensor network system 10 may include either more or fewer components (including the virtual sensor management server 100, the SDTM server 200, the application servers 300, sensor network adapters 11, and the real sensors 12) than the components shown in FIG. 2.

In the sensor network system 10, sensing data generated by sensing devices (such as real sensors and virtual sensors) can be distributed. For example, sensing data generated by the real sensors 12 can be distributed to the virtual sensor management server 100, and sensing data generated by the virtual sensors can be distributed to the application servers 300.

The sensor network unit 14 includes, for example, multiple sensor network adapters 11. Each sensor network adapter 11 is connected to multiple real sensors 12. The real sensors 12 are connected to the Internet 15 through each sensor network adapter 11.

Each real sensor 12 observes a target to obtain sensing data. Each real sensor 12 may be an image sensor (camera), a temperature sensor, a humidity sensor, an illumination sensor, a force sensor, a sound sensor, a radio frequency identification (RFID) sensor, an infrared sensor, a posture sensor, a rain sensor, a radiation sensor, or a gas sensor. Each real sensor 12 may be any other sensor.

Each real sensor 12 may be a stationary sensor, or a mobile sensor, such as a mobile phone, a smartphone, or a tablet. Each real sensor 12 may be a single sensing device, or may include multiple sensing devices. The real sensors 12 may be installed for any purposes. For example, the real sensors 12 may be installed for factory automation (FA) and production management at a factory, urban traffic control, weather or other environmental measurement, healthcare, or crime prevention.

In the sensor network unit 14, the sensor network adapters 11 are located at different sites (remote from one another), and the real sensors 12 connected to each sensor network adapter 11 are located at the same site (or close sites). The sensor network adapters 11 and the real sensors 12 may be located in a different manner.

Each application server 300 (300A or 300B) executes an application that uses sensing data, and is implemented by, for example, a general-purpose computer. The application server 300 obtains sensing data for use through the Internet 15.

The virtual sensor management server 100 implements a virtual sensor. The virtual sensor management server 100 implements multiple processing modules 150, an input candidate management module 110, an input quality check module 120, and a session control module 130, and manages input candidate DBs 140 and a processing module metadata DB 160. The multiple processing modules 150, the input candidate management module 110, the input quality check module 120, and the session control module 130 are, for example, software modules.

Each processing module 150 includes at least one input port and generates output data different from input data input into the input port based on the input data. For example, the processing module 150 may output data representing the number of people in a room based on input data (audio data) output from a sound sensor installed in the room. In this case, the processing module 150 and the real sensor 12 (sound sensor) can implement a virtual sensor that detects the number of people in a room.

The input candidate management module 110 manages candidates for the real sensors 12 (input sensor candidates) that output input data to the processing module 150. The input quality check module 120 checks the quality of input data output to the processing module 150. The session control module 130 controls sessions between the processing module 150 and the real sensors 12.

When, for example, the input quality check module 120 determines that the quality of input data fails to satisfy predetermined criteria, the session control module 130 switches the input sensor for the processing module 150 to another one of input sensor candidates extracted in advance. Each software module and each database will be described in detail later.

The SDTM server 200 implements distribution of sensing data in the sensor network system 10. The SDTM server 200 implements an input candidate search module 210 and a data flow control module 220, and manages a sensor metadata DB 230. The input candidate search module 210 and the data flow control module 220 are, for example, software modules.

The input candidate search module 210 searches for input sensor candidates for the processing module 150 in response to a request from the virtual sensor management server 100 (input candidate management module 110). The data flow control module 220 controls, for example, distribution of sensing data from the real sensors 12 to the processing module 150 in response to a request from the virtual sensor management server 100 (session control module 130). Each software module and each database will be described in detail later.

2-2. Example Hardware Configuration of Virtual Sensor Management Server

Figures 3, 4:
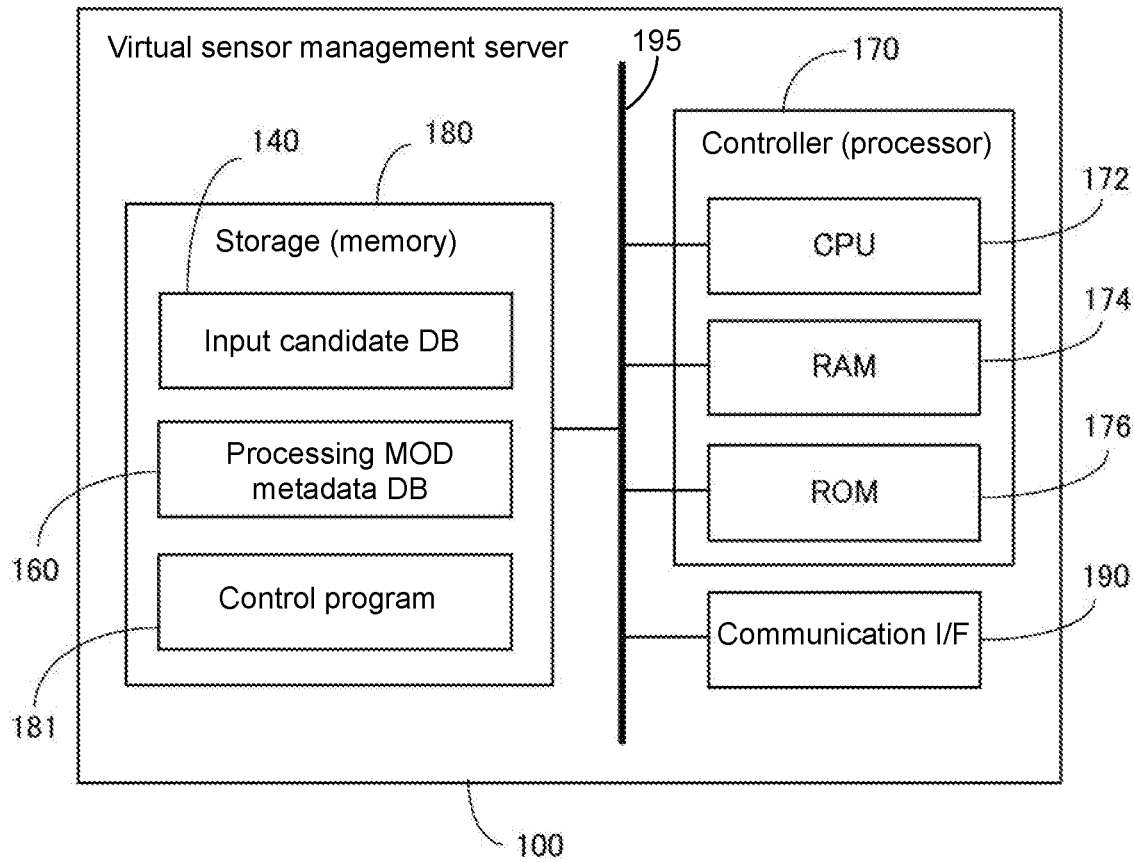
FIG. 3 is a diagram of a virtual sensor management server showing its example hardware configuration.
FIG. 4 is a diagram showing an example input candidate database (DB).

FIG. 3 is a diagram of the virtual sensor management server 100 showing its example hardware configuration. The virtual sensor management server 100 according to the present embodiment is implemented by, for example, a general-purpose computer.

In the example in FIG. 3, the virtual sensor management server 100 includes a controller 170, a communication interface (I/F) 190, and a storage 180. The components are electrically connected to one another with a bus 195.

The controller 170 includes, for example, a central processing unit (CPU) 172, a random-access memory (RAM) 174, and a read-only memory (ROM) 176. The controller 170 controls each unit in accordance with the information processing to be performed.

The communication I/F 190 communicates with external devices (e.g., the SDTM server 200, the application servers 300, and the sensor network unit 14 in FIG. 2) external to the virtual sensor management server 100 through the Internet 15. The communication I/F 190 includes, for example, a wired local area network (LAN) module and a wireless LAN module.

The storage 180 is an auxiliary storage device such as a hard disk drive or a solid-state drive. The storage 180 stores, for example, the input candidate DB 140, the processing module metadata DB 160, and a control program 181.

FIG. 4 is a diagram showing an example input candidate DB 140. Referring to FIG. 4, the input candidate DB 140 manages input sensor candidates for the processing module 150. In the input candidate DB 140, input sensor candidates are managed for each input port of the processing module 150. In this example, for an input port 2 of the processing module 150 (with an ID of M1), a sensor B1 is determined to be a first candidate, a sensor B2 is determined to be a second candidate, and a sensor B3 is determined to be a third candidate. Each input port may manage fewer than three input sensor candidates or four or more input sensor candidates.

As described in detail later, each input candidate DB 140 is repeatedly updated in predetermined cycles. When, for example, the specifications of each real sensor 12 included in the sensor network unit 14 are changed, input sensor candidates listed in the input candidate DB 140 are changed.

FIG. 5 is a table showing an example processing module metadata DB 160. Referring to FIG. 5, the processing module metadata DB 160 manages metadata indicating the conditions of input data output to the processing module 150. The metadata of each processing module 150 implemented by the virtual sensor management server 100 is registered in advance with the processing module metadata DB 160. The processing module metadata DB 160 manages metadata for each input port of the processing module 150.

The processing module metadata includes, for example, basic conditions and quality conditions. The basic conditions are the conditions to be basically satisfied by each real sensor 12 that outputs input data (sensing data), including a class, an observation target, and an installation location.

The class refers to the type of the real sensor 12. Examples of the class include a temperature sensor, an illumination sensor, and a camera. The observation target refers to a target to be observed by the real sensor 12. Examples of the observation target include outside temperature, a station ticket gate, illumination, and temperature. The installation location refers to the location where the real sensor 12 is installed. Examples of the installation location include positions P1, P2, and P3 (P1, P2, and P3 indicate specific positions such as Kyoto Station Area).

The quality conditions relate to the quality of input data (sensing data). Examples of the conditions include an outlier condition, a data dropout frequency condition, and a manufacturer condition. Besides these, the quality conditions may also include a sensor state condition, a sensor installation condition, a sensor maintenance history condition, a data specification condition, and a data resolution condition.

The outlier condition relates to the probability that the input data output from the real sensor 12 falls in a range of outliers. The data dropout frequency condition relates to the probability that data fails to be input into an input port at an intended time. The manufacturer condition relates to a manufacturer of the real sensor 12 that outputs the input data.

The sensor state condition relates to the state of the real sensor 12 that outputs the input data. Examples of the sensor state condition include the sensor to be acceptable when operating, and the sensor to be unacceptable after deteriorating to a predetermined level even partially. The sensor installation condition relates to the installation of the real sensor 12 that outputs the input data. Examples of the sensor installation condition include the sensor to be unacceptable when deviating from the initial installation position and the sensor to be acceptable when remaining without falling from the initial installation position. The sensor maintenance history condition relates to the maintenance history of the real sensor 12 that outputs the input data. Examples of the sensor maintenance history condition include the sensor maintenance to be unacceptable when the frequency of maintenance inspection is less than once per day and the sensor maintenance to be acceptable when the frequency of maintenance inspection is equal to or more than once per month. The data specification condition relates to the specifications of the input data. The data resolution condition relates to the resolution of the input data.

Referring back to FIG. 3, the control program 181 is used for the virtual sensor management server 100 and is executed by the controller 170. For example, modules such as the processing modules 150, the input candidate management module 110, the input quality check module 120, and the session control module 130 (FIG. 2) may be implemented by the controller 170 executing the control program 181. When the controller 170 executes the control program 181, the control program 181 is loaded into the RAM 174. The CPU 172 in the controller 170 then interprets and executes the control program 181 loaded in the RAM 174 to control each unit. Each software module implemented by the controller 170 in accordance with the control program 181 will be described.

2-3. Example Software Configuration of Virtual Sensor Management Server

Figure 6:
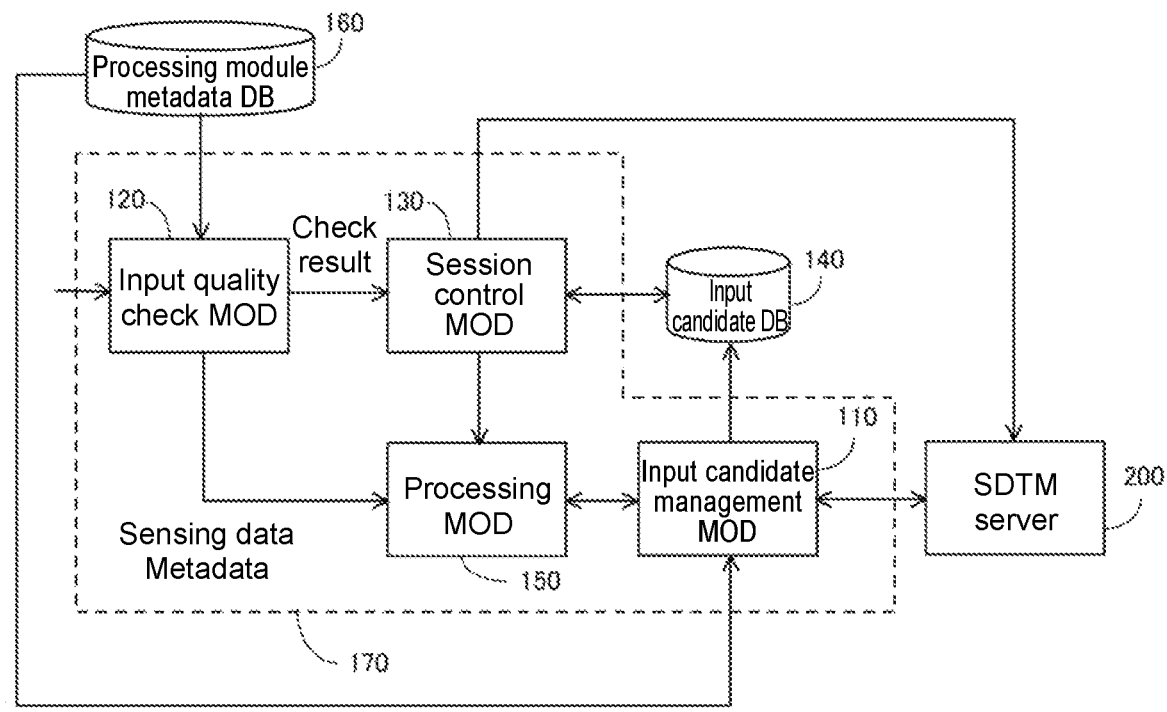
FIG. 6 is a diagram showing an example relationship between software modules implemented by a controller.

FIG. 6 is a diagram showing an example relationship between the software modules implemented by the controller 170. In the example in FIG. 6, the controller 170 implements the processing module 150, the input candidate management module 110, the input quality check module 120, and the session control module 130.

Referring to the processing module metadata DB 160, the input candidate management module 110 extracts the real sensors 12 suitable for the input sensors for the processing module 150 in cooperation with the SDTM server 200. The extracted input sensor candidates are managed in the input candidate DB 140.

Referring to the processing module metadata DB 160, the input quality check module 120 checks whether the quality of data currently input into the processing module 150 satisfies the conditions of input data output to the processing module 150.

The session control module 130 determines whether the input sensor for the processing module 150 is to be switched based on the check results of the input quality check module 120. When determining that the input sensor is to be switched, the session control module 130 switches the input sensor to any of the real sensors 12 managed in the input candidate DB 140.

The input candidate management module 110, the input quality check module 120, and the session control module 130 will be described one after another in detail.

2-3-1. Input Candidate Management Module

Figure 7:
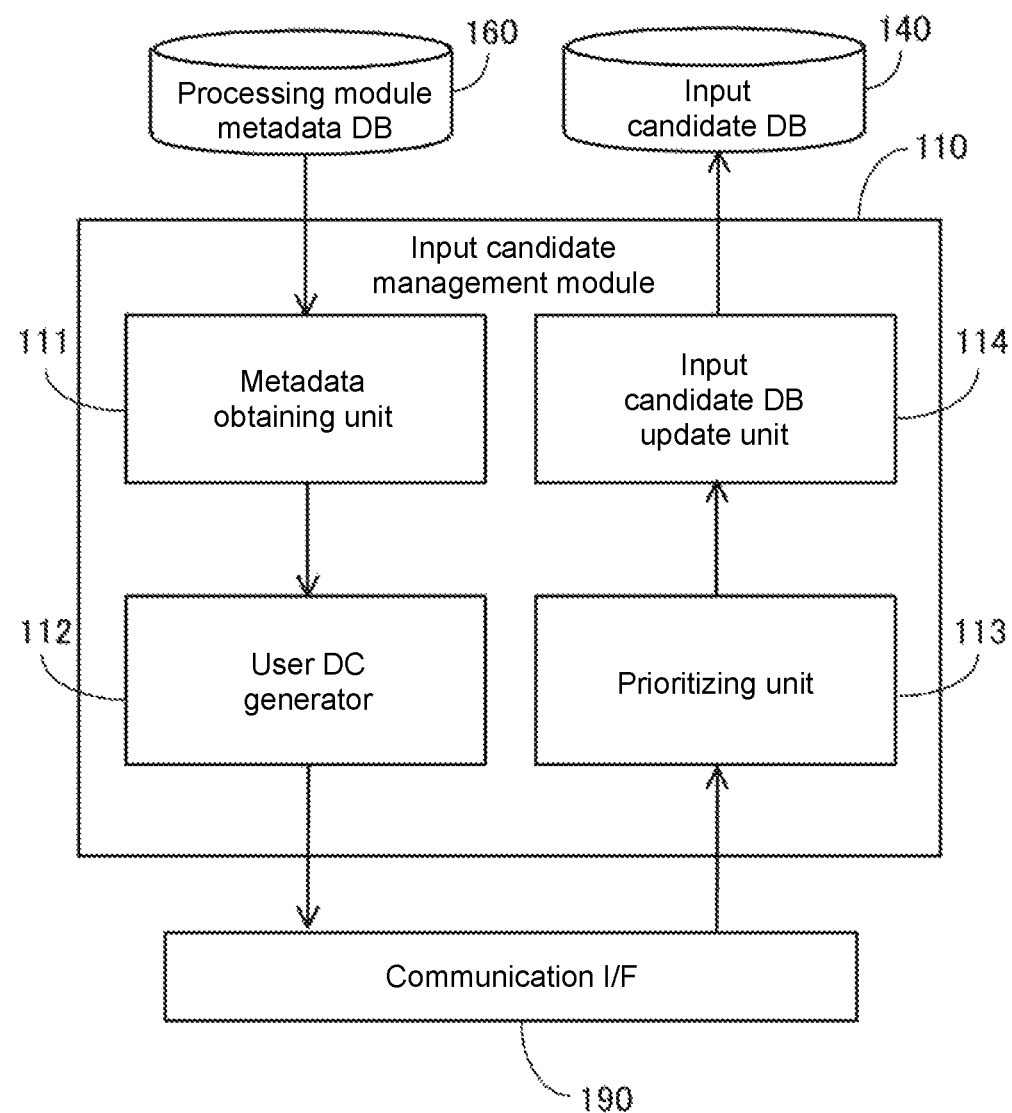
FIG. 7 is a diagram of an input candidate management module showing its detailed example configuration.

FIG. 7 is a diagram of the input candidate management module 110 showing its detailed example configuration. In the example in FIG. 7, the input candidate management module 110 includes a metadata obtaining unit 111, a user data catalogue generator 112, a prioritizing unit 113, and an input candidate DB update unit 114. The input candidate management module 110 extracts input sensor candidates for each input port of the processing module 150. Input sensor candidates for each input port may be extracted in parallel or in sequence. The modules will be described below using one input port of each processing module 150.

The metadata obtaining unit 111 obtains, from the processing module metadata DB 160, processing module metadata 161 (FIG. 1) associated with the input port for which input sensor candidates are to be extracted.

The user data catalogue generator 112 generates a user data catalogue based on the processing module metadata 161 obtained by the metadata obtaining unit 111. The user data catalogue lists the attributes of the real sensor 12 to be used by a user (virtual sensor management server 100). The user data catalogue contains the conditions of input data indicated by the processing module metadata 161. For example, the user data catalogue contains the basic conditions and the quality conditions of the input data.

The user data catalogue generated by the user data catalogue generator 112 is transmitted to the SDTM server 200 through the communication I/F 190. As described in detail later, the SDTM server 200 extracts the real sensor 12 satisfying the conditions listed in the user data catalogue. The SDTM server 200 receives information that can identify the extracted real sensor 12 (hereafter also referred to as real sensor information) through the communication I/F 190. The real sensor information includes, for example, information indicating an IP address allocated to each real sensor 12 (information indicating the location of the real sensor 12 on the Internet 15) and the attributes of the real sensor 12.

When multiple pieces of real sensor information are received, the prioritizing unit 113 prioritizes the real sensors 12. The prioritizing unit 113 may prioritize each of the real sensors 12 with any criterion. When, for example, the outlier condition is prioritized among the conditions contained in the user data catalogue, the prioritizing unit 113 may assign a higher priority to the real sensor 12 having a lower outlier frequency.

The input candidate DB update unit 114 updates the input candidate DB 140 (FIG. 4) in accordance with the priority assigned by the prioritizing unit 113. Thus, the input candidate DB 140 manages the real sensors 12 that satisfy the conditions listed in the user data catalogue in advance as input sensor candidates.

2-3-2. Input Quality Check Module

Figure 8:
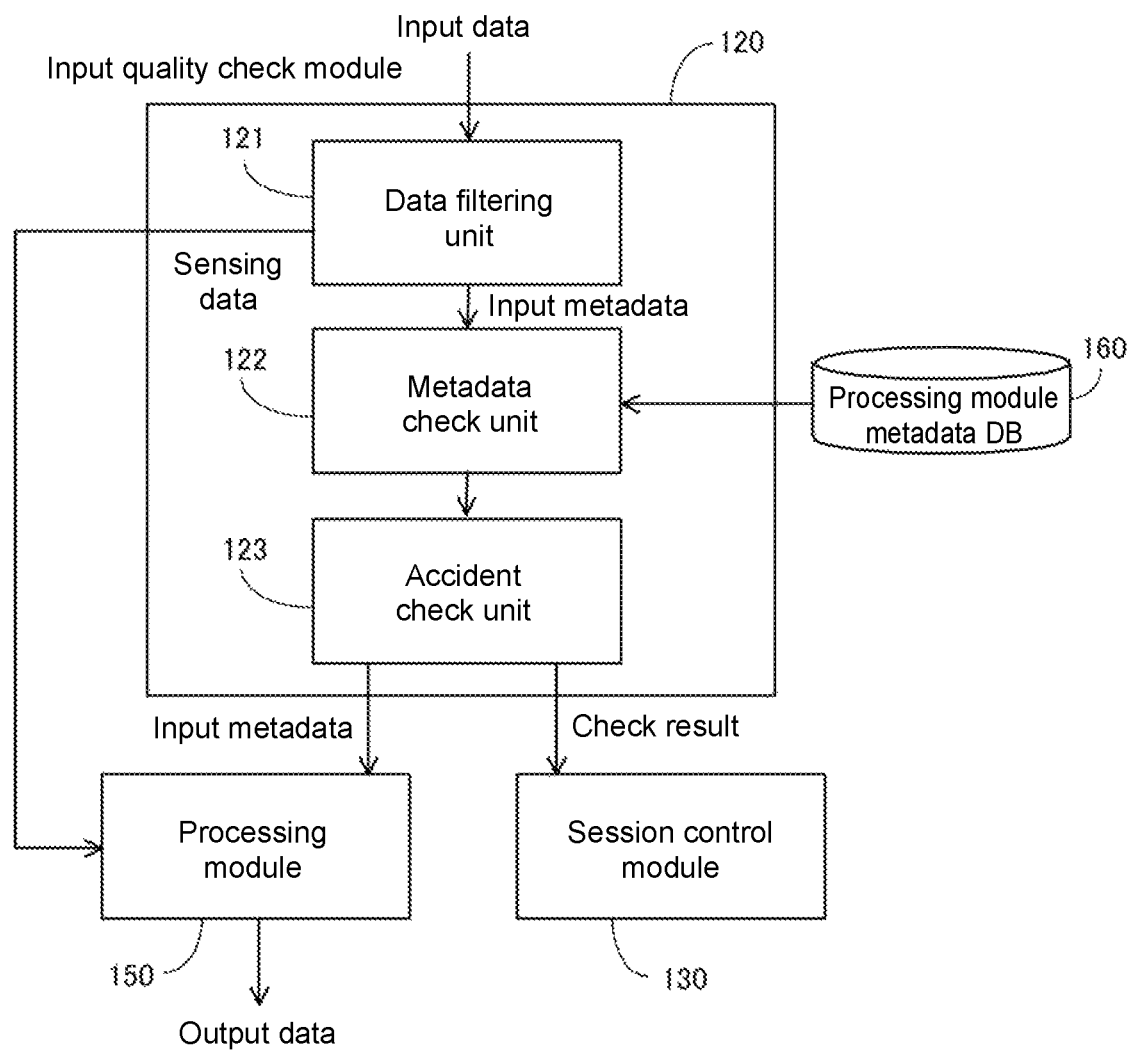
FIG. 8 is a diagram of an input quality check module showing its detailed example configuration.

FIG. 8 is a diagram of the input quality check module 120 showing its detailed example configuration. In the example in FIG. 8, the input quality check module 120 includes a data filtering unit 121, a metadata check unit 122, and an accident check unit 123. The input data output from the real sensor 12 contains sensing data and metadata associated with the sensing data (hereafter also referred to as input metadata). The sensing data is generated by the real sensor 12 observing a target. The input metadata indicates the attributes of the sensing data generated by the real sensor 12.

FIG. 9 is a table showing example input metadata 60 associated with sensing data. In the example in FIG. 9, the input metadata 60 contains basic attributes and quality attributes. The basic attributes are the basic attributes of the real sensor 12 that outputs the input data, including a class, an observation target, and an installation location.

The quality attributes relate to the quality of sensing data, including an outlier frequency, a data dropout frequency, and the manufacturer of each real sensor 12. The quality attributes may further include a sensor state attribute, a sensor installation attribute, a sensor maintenance history attribute, a data specification attribute, and a data resolution attribute. Unlike the processing module metadata 161, the input metadata 60 associated with sensing data can at least partially change every moment. For example, the outlier frequency that may be contained in the input metadata 60 is not predefined at the shipment of the real sensor 12 but can change with the continuous operation of the real sensor 12. For example, the outlier frequency is low immediately after the shipment when the real sensor 12 is new. However, the outlier frequency increases as the real sensor 12 is operated for a long period of time. The real sensor 12 monitors, for example, whether the sensing data falls in a range of outliers, and sequentially updates the outlier frequency within a predetermined period. The updated outlier frequency is associated with the sensing data as the input metadata 60. In addition to the outlier frequency, for example, other attributes such as the data dropout frequency, the sensor state attribute, and the sensor maintenance history attribute can change every moment.

Referring back to FIG. 8, the data filtering unit 121 divides the input data output from the real sensor 12 into sensing data and input metadata. The sensing data is output to the processing module 150. The input metadata is output to the metadata check unit 122.

The metadata check unit 122 obtains, from the processing module metadata DB 160 (FIG. 5), the processing module metadata 161 (FIG. 1) associated with the input port that receives data. The metadata check unit 122 determines whether the sensing data satisfies the conditions of input data based on the processing module metadata 161 and the input metadata. When, for example, the attributes indicated by the input metadata satisfy the conditions indicated by the processing module metadata 161, the metadata check unit 122 determines that the sensing data satisfies the conditions of input data.

More specifically, the metadata check unit 122 determines whether the quality of sensing data satisfies the quality conditions of input data based on the processing module metadata 161 and input metadata. When, for example, the quality attributes indicated by the input metadata satisfy the quality conditions indicated by the processing module metadata 161, the metadata check unit 122 determines that the quality of the sensing data satisfies the quality conditions of input data.

The accident check unit 123 determines whether the input data has any accident based on metadata associated with the sensing data. When, for example, the input metadata has garbling, a probability of being an outlier higher than the outlier frequency, or a dropout frequency higher than the data dropout frequency, the accident check unit 123 determines that the input data has an accident.

The input metadata is then input into the processing module 150. The input quality check results based on the check results of the metadata check unit 122 and the accident check unit 123 are input into the session control module 130.

For example, the input quality check result is determined as affirmative when the quality of the sensing data is determined to satisfy the quality conditions of input data and the input data is determined to have no accident. The input quality check result is determined as negative when the quality of the sensing data is determined to fail to satisfy the quality conditions of input data or the input data is determined to have any accident.

2-3-3. Session Control Module

Figure 10:
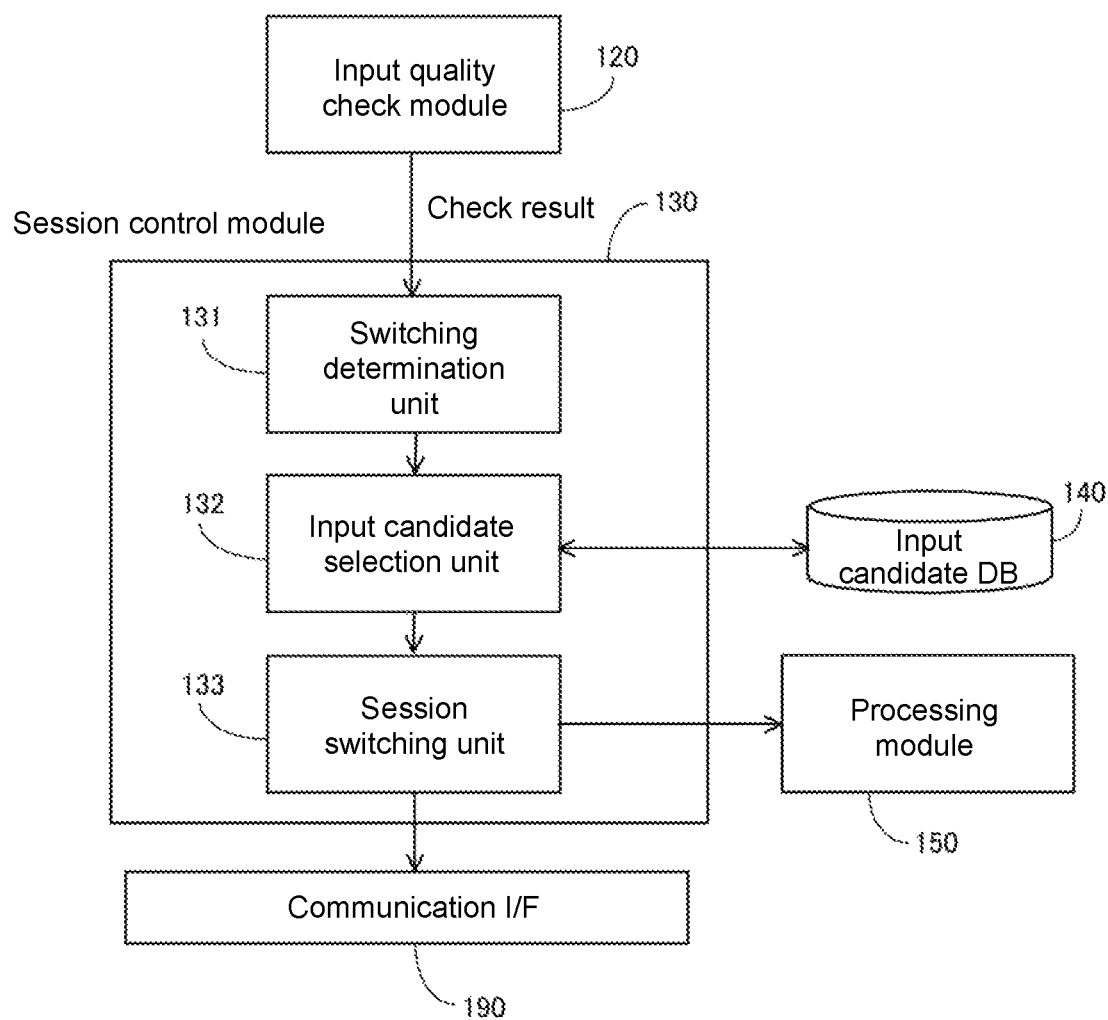
FIG. 10 is a diagram of a session control module showing its detailed example configuration.

FIG. 10 is a diagram of the session control module 130 showing its detailed example configuration. The session control module 130 controls switching of a session between the processing module 150 and the real sensor 12. Switching of a session between the processing module 150 and the real sensor 12 refers to switching of an input sensor for the processing module 150 to another real sensor 12. In the example in FIG. 10, the session control module 130 includes a switching determination unit 131, an input candidate selection unit 132, and a session switching unit 133.

The switching determination unit 131 determines whether the input sensor for the processing module 150 is to be switched based on the input quality check result of the input quality check module 120. For example, the switching determination unit 131 determines that the input sensor is not to be switched when the input quality check result is affirmative, and determines that the input sensor is to be switched when the input quality check result is negative.

When the switching determination unit 131 determines that the input sensor is to be switched, the input candidate selection unit 132 selects any of the real sensors 12 from the input candidates registered with the input candidate DB 140 (FIG. 4). The input candidate selection unit 132 selects, for example, a real sensor 12 having a high priority in the input candidate DB 140 among the multiple real sensors 12 associated with the input port for which the input sensor is determined to be switched. The real sensor 12 selected by the input candidate selection unit 132 is hereafter also referred to as a selected real sensor.

The session switching unit 133 switches the input sensor to the selected real sensor. More specifically, the session switching unit 133 controls the input port of the processing module 150 to switch the input sensor to the selected real sensor. The session switching unit 133 then transmits a sensor switching command to the SDTM server 200 through the communication I/F 190 to transfer data from the selected real sensor to the input port. The sensor switching command will be described in detail later.

When, for example, the quality of input data fails to satisfy the quality conditions, the input sensor can be switched to the real sensor 12 that outputs input data satisfying the quality conditions.

2-4. Example Configuration of Hardware of SDTM Server

Figure 11:
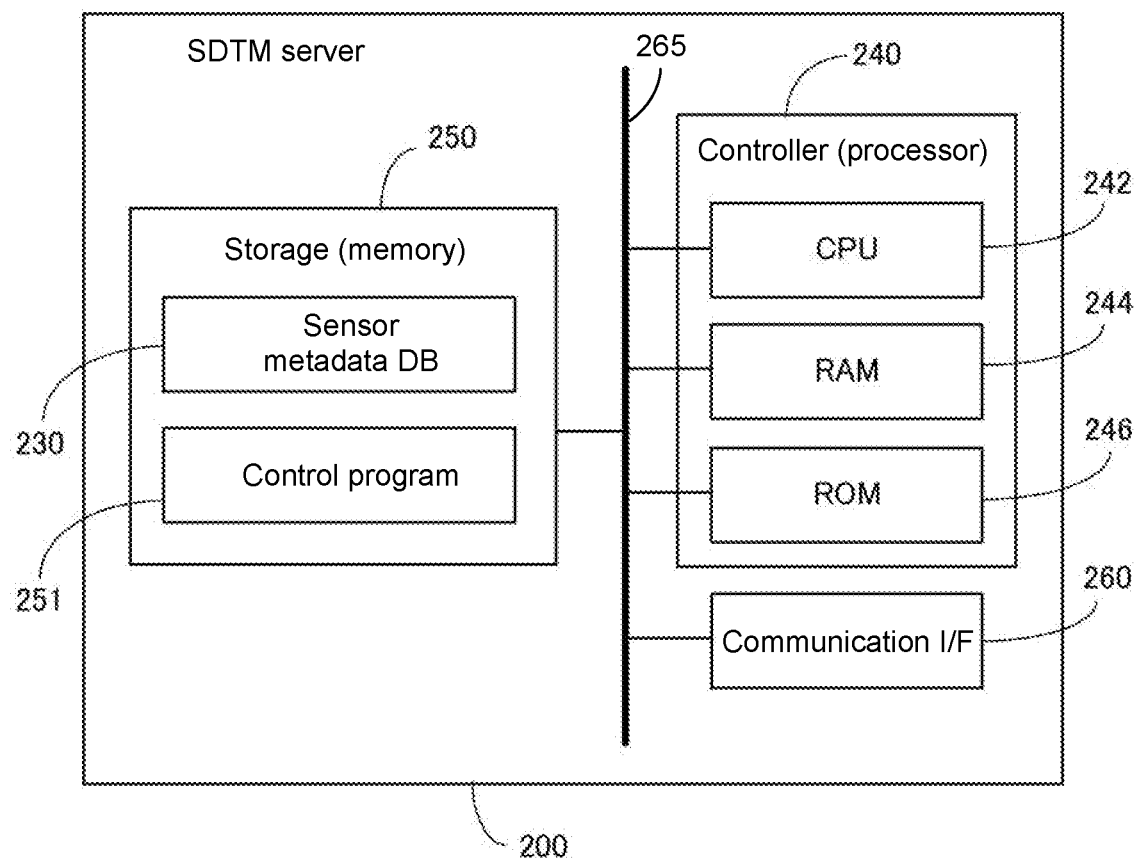
FIG. 11 is a diagram of a sensing data trading market (SDTM) server showing its example hardware configuration.

FIG. 11 is a diagram of the SDTM server 200 showing its example hardware configuration. The SDTM server 200 according to the present embodiment is implemented by, for example, a general-purpose computer.

In the example in FIG. 11, the SDTM server 200 includes a controller 240, a communication I/F 260, and a storage 250. The components are electrically connected to one another with a bus 265.

The controller 240 includes, for example, a CPU 242, a RAM 244, and a ROM 246. The controller 240 controls each unit in accordance with the information processing to be performed.

The communication I/F 260 communicates with external devices (e.g., the virtual sensor management server 100, the application servers 300, and the sensor network unit 14; refer to FIG. 2) external to the SDTM server 200 through the Internet 15. The communication I/F 260 includes, for example, a wired LAN module and a wireless LAN module.

The storage 250 is an auxiliary storage such as a hard disk drive or a solid-state drive. The storage 250 stores, for example, the sensor metadata DB 230 and a control program 251.

FIG. 12 is a table showing an example sensor metadata DB 230. Referring to FIG. 12, the sensor metadata DB 230 manages metadata indicating the attributes of the real sensors 12 included in the sensor network unit 14 (FIG. 2). Metadata of each real sensor 12 included in the sensor network unit 14 is registered in advance with the sensor metadata DB 230. The sensor metadata DB 230 manages metadata for each real sensor 12.

The sensor metadata includes, for example, basic attributes and quality attributes. The basic attributes are the basic attributes to be satisfied by the real sensor 12, including a class, an observation target, and an installation location.

The quality attributes relate to the quality of the sensing data output from the real sensor 12, including an outlier frequency, a data dropout frequency, and the manufacturer of the real sensor 12. The quality attributes may further include a sensor state attribute, a sensor installation attribute, a sensor maintenance history attribute, a data specification attribute, and a data resolution attribute.

Referring back to FIG. 11, the control program 251 is used for the SDTM server 200 and is executed by the controller 240. For example, the input candidate search module 210 and the data flow control module 220 (FIG. 2) may be implemented by the controller 240 executing the control program 251. When the controller 240 executes the control program 251, the control program 251 is loaded into the RAM 244. The CPU 242 in the controller 240 then interprets and executes the control program 251 loaded in the RAM 244 to control each unit. Each software module implemented by the controller 240 in accordance with the control program 251 will be described.

2-5. Example Software Configuration of SDTM Server

Referring back to FIG. 2, the controller 240 implements the input candidate search module 210 and the data flow control module 220 in the SDTM server 200. The software modules will be described one after another.

2-5-1. Input Candidate Search Module

Figure 13:
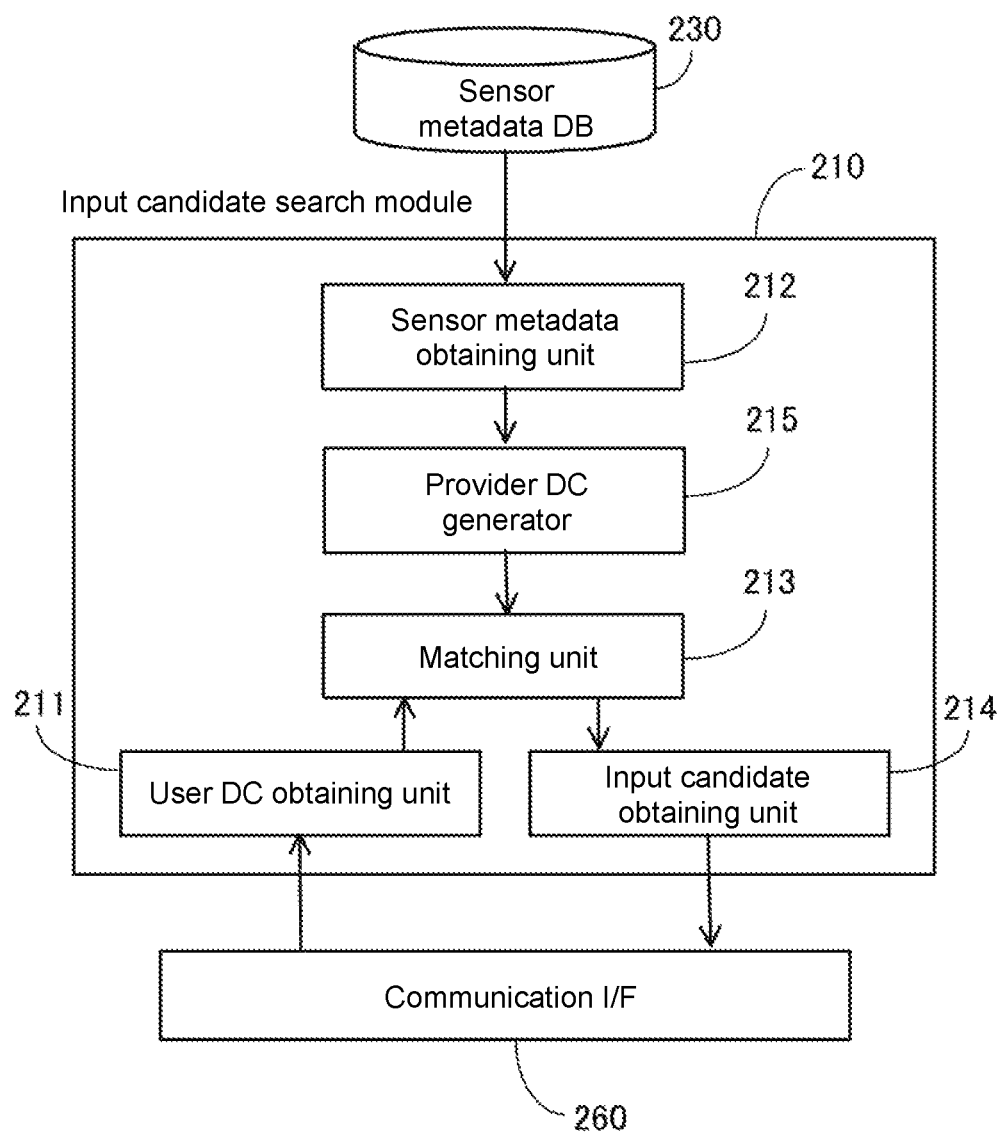
FIG. 13 is a diagram of an input candidate search module showing its detailed example configuration.

FIG. 13 is a diagram of the input candidate search module 210 showing its detailed example configuration. In the example in FIG. 13, the input candidate search module 210 includes a user data catalogue obtaining unit 211, a sensor metadata obtaining unit 212, a provider data catalogue generator 215, a matching unit 213, and an input candidate obtaining unit 214.

The user data catalogue obtaining unit 211 obtains the above user data catalogue from the virtual sensor management server 100 (input candidate management module 110) through the communication I/F 260.

The sensor metadata obtaining unit 212 obtains the sensor metadata 13 (FIG. 1) associated with each real sensor 12 registered with the sensor metadata DB 230 (FIG. 12).

The provider data catalogue generator 215 generates a provider data catalogue based on the sensor metadata 13. The provider data catalogue is generated for each real sensor 12 registered with the sensor metadata DB 230. The provider data catalogue lists the attributes of each provider (each real sensor 12). The provider data catalogue contains the attributes of the real sensor 12 indicated by the sensor metadata 13. For example, the provider data catalogue includes the above basic attributes and quality attributes.

The matching unit 213 determines whether the user data catalogue obtained by the user data catalogue obtaining unit 211 matches the provider data catalogue generated by the provider data catalogue generator 215. When, for example, the attributes of the real sensor 12 contained in the provider data catalogue satisfy the conditions of input data output to the processing module 150 contained in the user data catalogue, their matching is successful. When the matching is successful, the real sensor 12 associated with the provider data catalogue is extracted as an input sensor candidate. When, for example, the attributes of the real sensor 12 contained in the provider data catalogue fail to satisfy the conditions of input data output to the processing module 150 contained in the user data catalogue, their matching is unsuccessful. When the matching is unsuccessful, the real sensor 12 associated with the provider data catalogue is not extracted as an input sensor candidate.

The input candidate obtaining unit 214 obtains information that can identify the real sensor 12 (real sensor information) extracted as the input sensor candidate by the matching unit 213. The real sensor information obtained by the input candidate obtaining unit 214 is transmitted to the virtual sensor management server 100 (input candidate management module 110) through the communication I/F 260.

2-5-2. Data Flow Control Module

Figure 14:
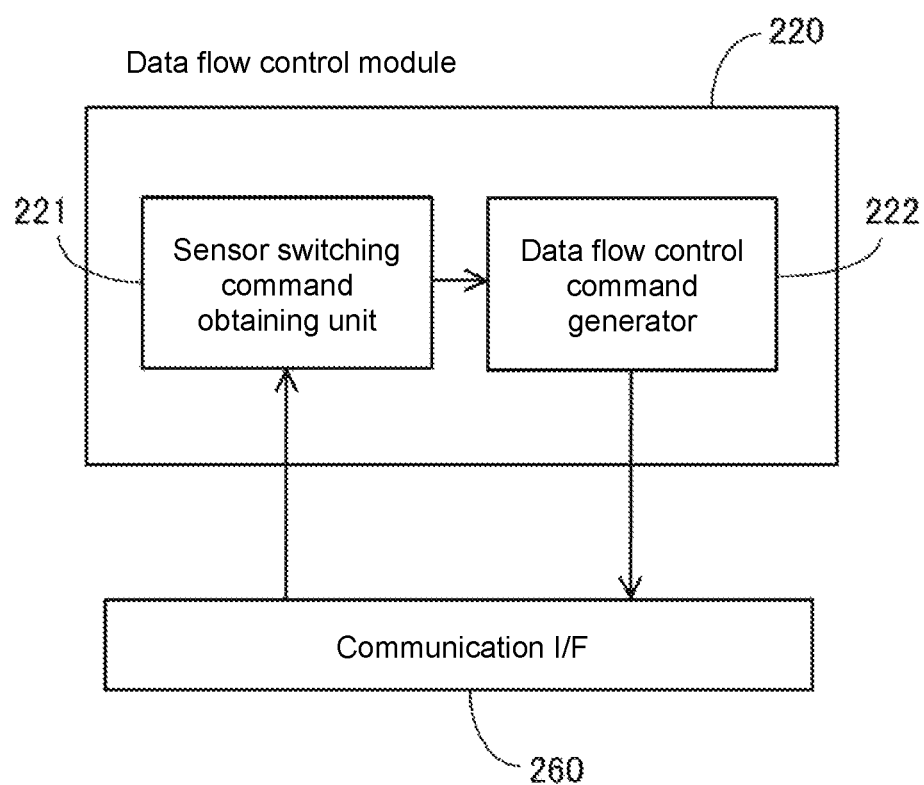
FIG. 14 is a diagram of a data flow control module showing its detailed example configuration.

FIG. 14 is a diagram of the data flow control module 220 showing its detailed example configuration. In the example in FIG. 14, the data flow control module 220 includes a sensor switching command obtaining unit 221 and a data flow control command generator 222.

The sensor switching command obtaining unit 221 obtains the above sensor switching command from the virtual sensor management server 100 (session control module 130) through the communication I/F 260. The sensor switching command includes, for example, real sensor information about the real sensor 12 (current real sensor 12) that currently outputs input data to the processing module 150 and real sensor information about the switching target real sensor 12.

The data flow control command generator 222 generates a data flow control command based on the real sensor information about the current real sensor 12 and the real sensor information about the switching target real sensor 12. The data flow control command includes an output stop command to stop outputting input data to the processing module 150 from the current real sensor 12, and an output start command to start outputting input data to the processing module 150 from the switching target real sensor 12. The output stop command is transmitted to the current real sensor 12 through the communication I/F 260. When the output stop command is transmitted to the current real sensor 12, the output of sensing data from the current real sensor 12 is stopped. The output start command is transmitted to the switching target real sensor 12 through the communication I/F 260. When, for example, the output of sensing data is allowed in response to the output start command, the switching target real sensor 12 transmits an application programming interface (API) to the virtual sensor management server 100 to establish communication with the target processing module 150. When the virtual sensor management server 100 executes the API, the switching target real sensor 12 starts outputting sensing data to the target processing module 150.

Figure 15:
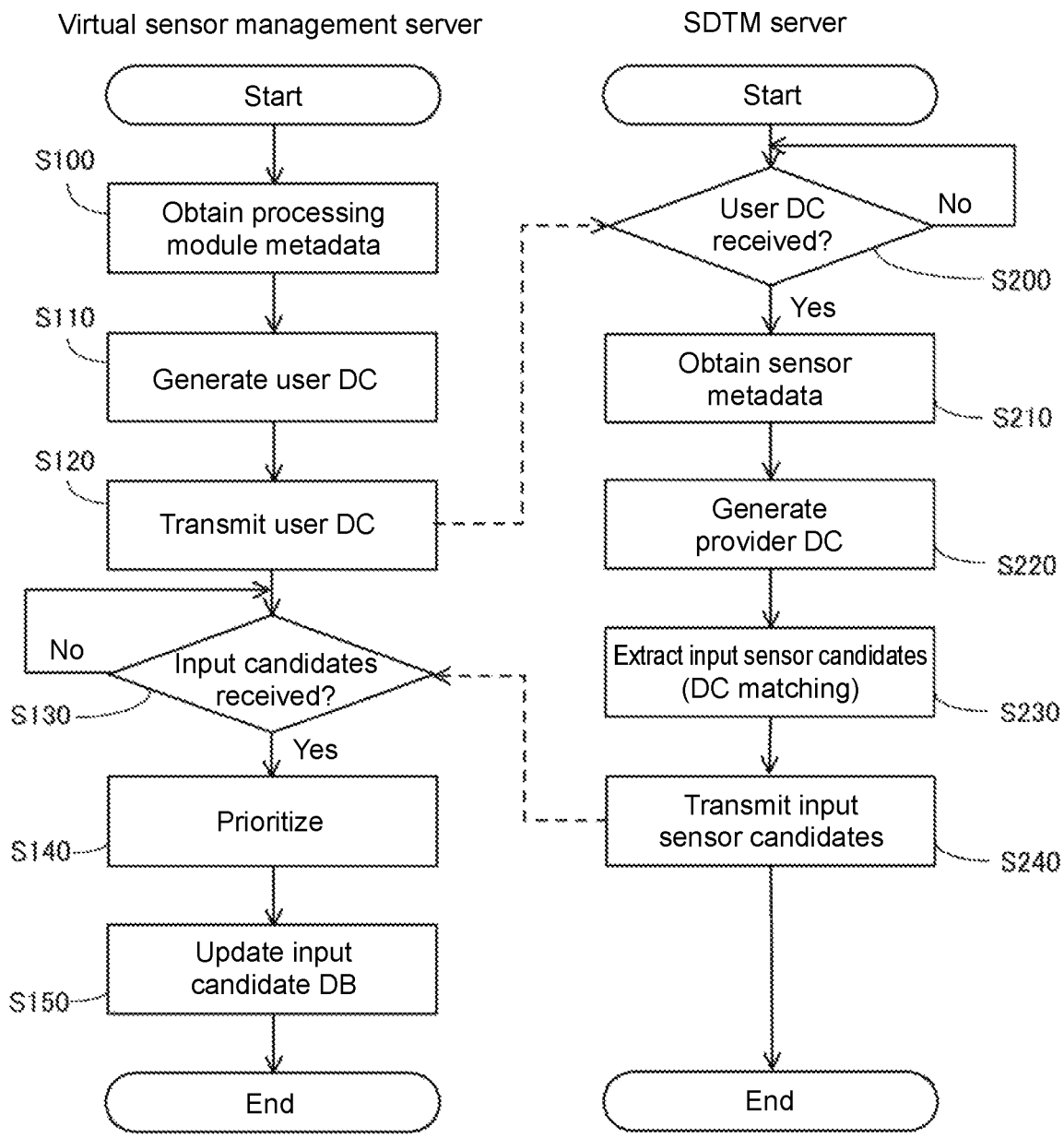
FIG. 15 is a flowchart showing an example operation of extracting input sensor candidates for a processing module.

3. Operation Examples 3-1. Operation Example of Extraction of Input Candidate FIG. 15 is a flowchart showing an example operation of the processing module 150 extracting input sensor candidates. The processing in this flowchart is performed in predetermined cycles. As described above, the input sensor candidates are extracted for each input port of the processing module 150. The procedure will be described using one input port of one processing module 150.

Referring to FIG. 15, the left part of the flowchart is performed when the controller 170 operates as the input candidate management module 110. The right part of the flowchart is performed when the controller 240 operates as the input candidate search module 210.

Referring to the left part of FIG. 15, the controller 170 obtains the processing module metadata 161 associated with the input port from the processing module metadata DB 160 (FIG. 5) (step S100). The controller 170 generates a user data catalogue based on the obtained processing module metadata 161 (step S110).

The controller 170 controls the communication I/F 190 to transmit the generated user data catalogue to the SDTM server 200 (step S120). The controller 170 then determines whether the information indicating the input sensor candidates (real sensor information) is received from the SDTM server 200 through the communication I/F 190 (step S130). When determining that the real sensor information is not received (No in step S130), the controller 170 waits until the real sensor information is received.

Referring to the right part of FIG. 15, the controller 240 determines whether the user data catalogue is received (step S200). When determining that the user data catalogue is not received (No in step S200), the controller 240 waits until the user data catalogue is received.

When determining that the user data catalogue is received (Yes in step S200), the controller 240 obtains the sensor metadata 13 of each real sensor 12 managed in the sensor metadata DB 230 (step S210). The controller 240 generates a provider data catalogue based on the obtained sensor metadata 13 (step S220).

The controller 240 extracts input sensor candidates from the multiple real sensors 12 managed in the sensor metadata DB 230 based on the obtained user data catalogue and the generated provider data catalogue (step S230).

When, for example, the attributes (e.g., the basic attributes and the quality attributes) listed in the provider data catalogue satisfy the conditions (e.g., the basic conditions and the quality conditions) listed in the user data catalogue, the controller 240 extracts the real sensors 12 associated with the provider data catalogue as input sensor candidates. For example, the controller 240 extracts input sensor candidates greater in number than the input ports of the processing module 150. When, for example, the processing module 150 has three input ports, the controller 240 extracts four or more input sensor candidates.

The controller 240 controls the communication I/F 260 to transmit the extracted multiple pieces of real sensor information to the virtual sensor management server 100 (step S240).

Referring back to the left part of FIG. 15, when multiple pieces of real sensor information (information indicating input sensor candidates) are received in step S130 (Yes in step S130), the controller 170 prioritizes each real sensor 12 with predetermined criteria (step S140).

The controller 170 then updates the input candidate DB 140 in accordance with the priorities (step S150). In other words, the controller 170 updates the input candidate DB 140 to manage the extracted input sensor candidates in accordance with the priorities assigned to them.

Thus, the virtual sensor management server 100 and the SDTM server 200 extract input sensor candidates for the processing module 150 based on the processing module metadata 161 and the sensor metadata 13. In other words, input sensor candidates are extracted using the conditions of input data output to the processing module 150. Thus, the virtual sensor management server 100 and the SDTM server 200 can extract, in advance, appropriate candidates for the real sensors 12 that output the input data to the processing module 150.

3-2. Operation Example of Checking Quality of Input Data

Figure 16:
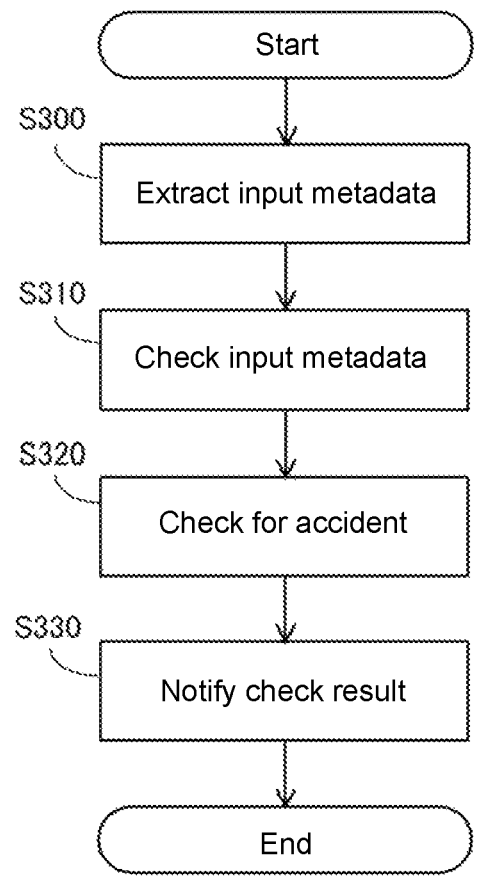
FIG. 16 is a flowchart showing an example operation of checking the quality of input data output to the processing module.

FIG. 16 is a flowchart showing an example operation of checking the quality of input data output to the processing module 150. The processing in this flowchart is performed when the controller 170 operates as the input quality check module 120 in response to input of data into the processing module 150. As described above, the quality of input data is checked for each input port of the processing module 150. The procedure will be described using one input port of one processing module 150.

Referring to FIG. 16, the controller 170 extracts input metadata from input data output to the processing module 150 (step S300). The controller 170 checks the extracted input metadata (step S310). For example, the controller 170 checks the quality of input data based on the processing module metadata 161 associated with the input port and the input metadata. For example, the controller 170 determines the quality of input data as affirmative when the quality attributes indicated by the input metadata satisfy the quality conditions indicated by the processing module metadata 161, and determines the quality of input data as negative when the quality attributes indicated by the input metadata fail to satisfy the quality conditions indicated by the processing module metadata 161.

The controller 170 then determines whether the input data has any accident based on the input metadata (step S320). For example, the controller 170 determines that the input data has an accident when the input metadata has garbling. For example, the controller 170 determines the quality of input data as negative when determining that the input data has an accident, and determines the quality of input data as affirmative when determining that the input data has no accident.

The input quality check module 120 (controller 170) notifies the session control module 130 (controller 170) of the input quality check result based on the determination results obtained in steps S310 and S320 (step S330). For example, the input quality check module 120 determines the input quality check result as affirmative when the quality is determined as affirmative in both steps S310 and S320, and determines the input quality check result as negative when the quality is determined as negative in at least one of steps S310 and S320.

As described above, in the virtual sensor management server 100, the input metadata includes the quality attributes of input data output to the processing module 150. The quality of input data is checked based on the input metadata. In other words, the virtual sensor management server 100 can check the quality of input data output to the processing module 150.

3-3. Session Switching Operation Example

Figure 17:
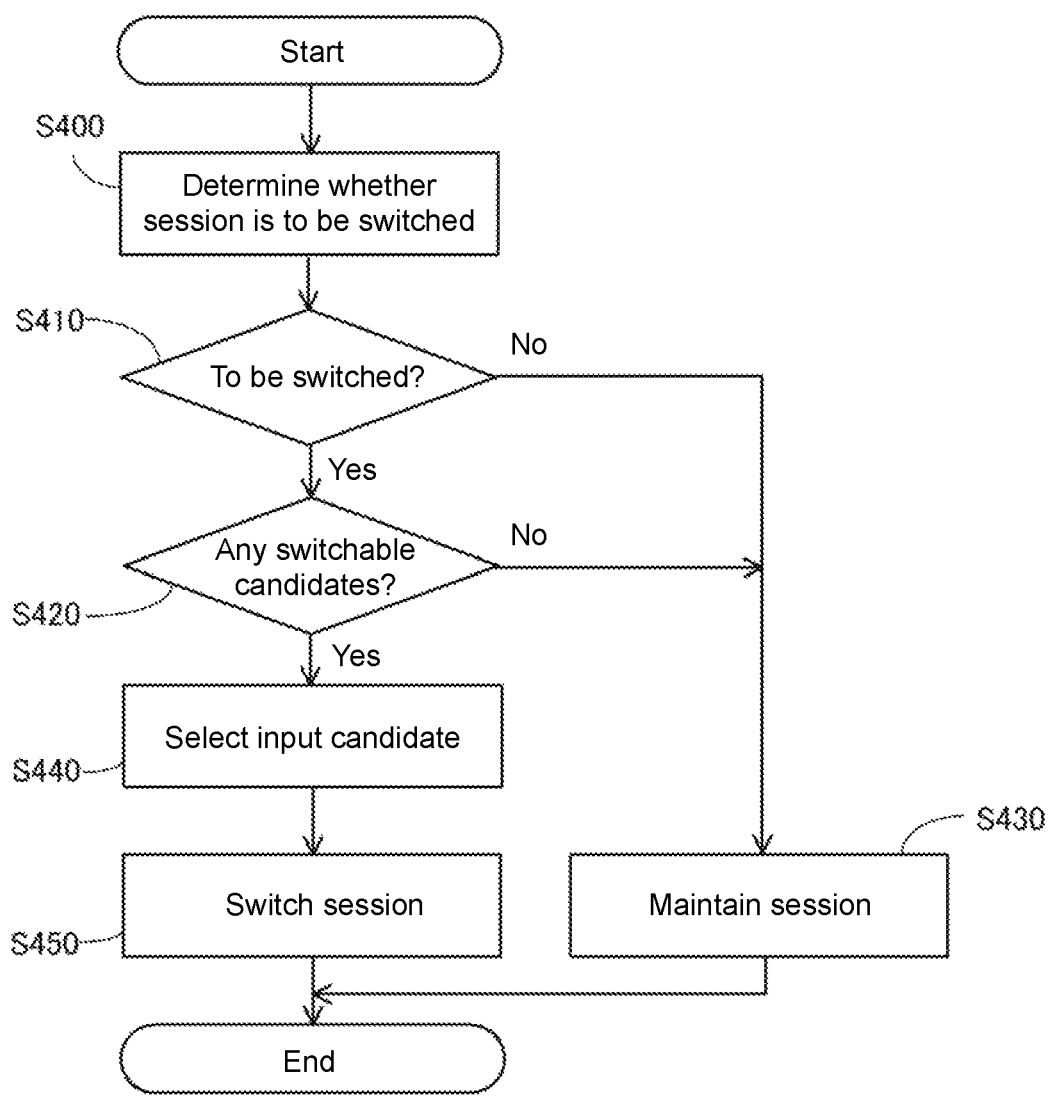
FIG. 17 is a flowchart showing an example operation of switching a session between the processing module and a real sensor.

FIG. 17 is a flowchart showing an example operation of switching a session between the processing module 150 and the real sensor 12. The processing in this flowchart is performed when the controller 170 operates as the session control module 130 in response to a notification of the input quality check result from the input quality check module 120. As described above, switching the session is performed for each input port of each processing module 150. The procedure will be described using one input port of one processing module 150.

Referring to FIG. 17, the controller 170 determines whether the session is to be switched based on the notified input quality check result (step S400). For example, the controller 170 determines that the session is not to be switched when the input quality check result is affirmative, and determines that the session is to be switched when the input quality check result is negative.

Subsequently, the controller 170 determines whether the session is determined to be switched in step S400 (step S410). When the session is determined not to be switched (No in step S410), the controller 170 maintains the session without switching the input sensor for the processing module 150 (step S430).

When the session is determined to be switched (Yes in step S410), the controller 170 determines whether any switchable candidate is available (step S420). For example, the controller 170 determines whether the input candidate DB 140 manages any input sensor candidates for the relevant input port. For example, the controller 170 determines that switchable candidates are available when the input candidate DB 140 manages input sensor candidates for the relevant input port, and determines that no switchable candidate is available when the input candidate DB 140 manages no input sensor candidate for the relevant input port.

When determining that no switchable candidate is available (No in step S420), the controller 170 maintains the session without switching the input sensor for the processing module 150 (step S430). When determining that switchable candidates are available (Yes in step S420), the controller 170 selects one input sensor candidate (selected real sensor) from input sensor candidates managed in the input candidate DB 140 (step S440).

The controller 170 then performs the processing for session switching (step S450). For example, the controller 170 controls the input port of the processing module 150 to switch the input sensor to the selected real sensor. The controller 170 also controls the communication I/F 190 to transmit the above sensor switching command to the SDTM server 200.

As described above, in the virtual sensor management server 100, the input sensor is switched to another real sensor 12 when the input data output to the processing module 150 fails to satisfy the quality conditions. Thus, the virtual sensor management server 100 discontinues input of data failing to satisfy the quality conditions into the processing module 150 and can maintain the quality of input data.

In the virtual sensor management server 100, real sensors 12 that output input data satisfying the quality conditions are extracted in advance, and the real sensor 12 that outputs input data to the processing module 150 is switched to any of the real sensors 12 extracted in advance. The virtual sensor management server 100 receives data satisfying the quality conditions from the switched real sensor 12 and can thus maintain the quality of input data output to the processing module 150.

3-4. Data Flow Control Operation Example

Figure 18:
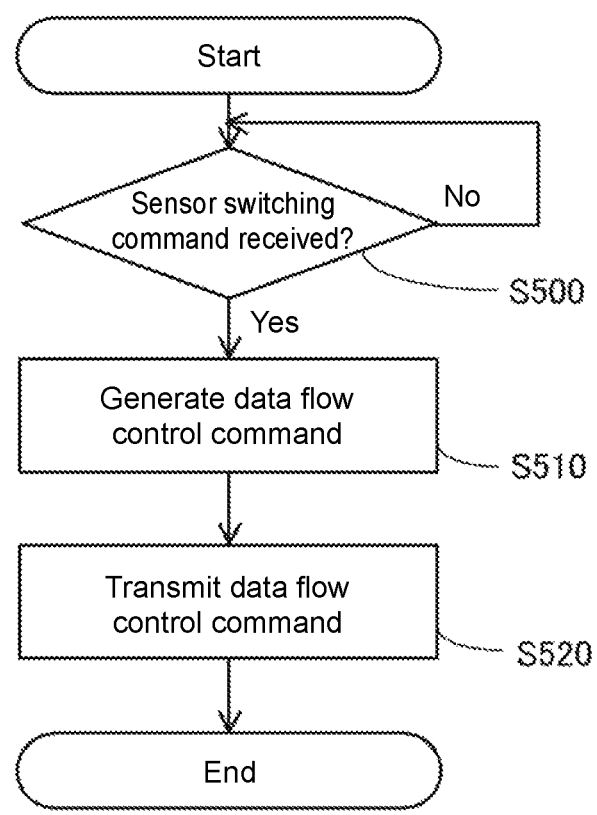
FIG. 18 is a flowchart showing an example of a data flow control operation.

FIG. 18 is a flowchart showing an example of a data flow control operation. The processing in this flowchart is performed when the controller 240 operates as the data flow control module 220 in response to a sensor switching command from the virtual sensor management server 100 through the communication I/F 260. As described above, the data flow is controlled for each input port of each processing module 150. The procedure will be described using one input port of one processing module 150.

Referring to FIG. 18, the controller 240 determines whether a sensor switching command is received from the virtual sensor management server 100 through the communication I/F 260 (step S500). When determining that the sensor switching command is not received (No in step S500), the controller 240 waits until the sensor switching command is received.

When determining that the sensor switching command is received (Yes in step S500), the controller 240 generates the above data flow control command (step S510). The controller 240 transmits the generated data flow control command to, for example, the current real sensor 12 or the switching target real sensor 12 (step S520). This completes the session switching between the processing module 150 and the real sensor 12.

4. Features

As described above, the controllers 170 and 240 in the present embodiment each select at least one or all of the multiple real sensors 12 from the multiple input sensor candidates managed in the input candidate DB 140 and switch the input sensor for the processing module 150 to at least one of the selected real sensors 12. Each of the multiple input sensor candidates managed in the input candidate DB 140 outputs input data satisfying quality conditions of input data output to the processing module 150. Thus, the virtual sensor management server 100 and the SDTM server 200 allow output of input data satisfying the quality conditions from the switched real sensor 12 and can thus maintain the quality of input data output to the processing module 150.

The processing module 150 is an example of a processing module in an aspect of the present invention, the real sensor 12 is an example of a device in an aspect of the present invention, and the structure including the input candidate management module 110, the input candidate search module 210, and the session control module 130 is an example of a session control apparatus in an aspect of the present invention. The quality conditions contained in the processing module metadata 161 are examples of a condition in an aspect of the present invention. The matching unit 213 is an example of an extraction unit in an aspect of the present invention, the input candidate selection unit 132 is an example of a selection unit in an aspect of the present invention, and the session switching unit 133 is an example of a switching unit in an aspect of the present invention.

5. Modifications

Although the embodiments have been described above, the present invention is not limited to these embodiments and can be modified in various manners without departing from the sprit and scope of the invention. Modifications will be described below. The modifications described below may be combined as appropriate.

5-1

In the above embodiments, input sensor candidates for the processing module 150 are extracted. Instead of input sensor candidates for the processing module 150, for example, candidates for data sets to be input into the processing module 150 may be extracted. Each data set includes multiple pieces of data generated in advance. An example of a data set is a set of sensing data obtained in advance by observing an object for a predetermined period. A data set is stored in, for example, a storage connected to the Internet 15.

In this case, for example, metadata indicating the attributes of each data set is managed by the SDTM server 200. A provider data catalogue is generated based on the metadata associated with the data set. Based on the user data catalogue and the provider data catalogue, data sets satisfying the conditions of input data output to the processing module 150 are extracted. In other words, based on the processing module metadata 161 and metadata associated with each data set, candidates for data sets greater in number than the input ports of the processing module 150 are extracted from multiple data sets. Thus, an appropriate data set satisfying the conditions of input data output to the processing module 150 can be extracted.

In the above embodiments, the quality of input data output to the processing module 150 is checked. Instead of the quality of input data, for example, the quality of a data set to be input into the processing module 150 may be checked. A data set includes multiple pieces of data and metadata indicating attributes regarding the quality of the multiple pieces of data. For example, the input quality check module 120 checks the quality of a data set including the metadata based on the metadata. Thus, the quality of a data set to be input into the processing module 150 can be checked.

In the above embodiments, when the input data output to the processing module 150 fails to satisfy the quality conditions, the input sensor for the processing module 150 is switched to another real sensor 12. Instead of switching a real sensor 12 to another, for example, a data set to be input into the processing module 150 may be switched to another data set when the input data output to the processing module 150 fails to satisfy the quality conditions.

In the above embodiments, a switching target real sensor 12 is selected from input sensor candidates extracted in advance. As described above, data sets may be extracted in advance, and a data set may be selected as a switching target. In this case, data contained in each of the multiple data set candidates extracted in advance satisfies the quality conditions of input data output to the processing module 150.

Both the real sensors 12 and the data sets may be extracted in advance as input candidates for the processing module 150 and selected as switching targets to be input into the processing module 150.

5-2

In the above embodiments, each input port of each processing module 150 performs a session with any of the real sensors 12. Instead of the real sensor 12, each input port may perform a session with, for example, a storage storing a data set or with a virtual sensor. Without performing a session with a sensor, input data output to the processing module 150 may be other than sensing data. Examples of the input data include shopping history data of each user at a shopping site and score data of each user at a game site.

5-3

In the above embodiments, the processing performed by the virtual sensor management server 100 and the SDTM server 200 may be implemented by, for example, multiple servers. In the above embodiments, the processing performed by the virtual sensor management server 100 and the SDTM server 200 may be implemented by, for example, a single server.

The invention claimed is:

1. A session control apparatus for controlling a session between a processing module and a device, from among a plurality of devices, that outputs input data to the processing module, the session control apparatus comprising a processor configured with a program to perform operations comprising:

operation as the processing module configured to generate, based on at least one piece of the input data, output data different from the at least one piece of input data, the input data generated by each of the plurality of devices including input metadata comprising a basic attribute defining the respective device and a quality attribute defining a quality of the input data output from the respective device, and to store processing metadata comprising a basic condition required by the processing module and a defined condition regarding a quality of the input data required by the processing module in a processing metadata database;

operation as a matching unit configured to extract a plurality of input device candidates from among the plurality of devices based on determining that device metadata of each of the input device candidates obtained from a device metadata database have the basic attribute and the quality attribute thereof satisfying the basic condition and the defined condition of the processing metadata;

operation as a metadata check unit configured to check the quality of current input data output from a current device to the processing module by:
obtaining from the processing metadata database processing metadata for a port on which the input data is received; and
determining whether the basic attribute and the quality attribute of the current input data comprised in the input metadata included in the current input data satisfies the basic condition and the defined condition of the processing metadata;

operation as an accident check unit configured to determine whether the input metadata included in the current input data indicates that the current input data has had an accident;

operation as an input device candidate selection unit configured to select at least one of the plurality of input device candidates in response to the input metadata included in the current input data not satisfying the basic condition and the defined condition of the processing metadata or indicating that the current input data has had an accident; and operation as a session switching unit configured to switch the device that outputs the input data to the processing module from the current device to the at least one input device candidate selected by the input device candidate selection unit, wherein each of the plurality of input device candidates outputs input data satisfying the basic condition and the defined condition of the processing metadata, and the defined condition comprises at least one of: an outlier condition; a data dropout frequency condition; and a manufacturer condition.

2. The session control apparatus according to claim 1, wherein
the processor is configured with the program such that operation as the session switching unit comprises switching, in response to the input metadata included in the current input data failing to satisfy the basic condition and the defined condition of the processing metadata, the device that outputs the input data to the processing module to the at least one of the plurality of input device candidates selected by the input device candidate selection unit.

3. The session control apparatus according to claim 1, wherein
the devices comprise sensors, and
the input data comprises sensing data generated by the sensors.

4. The session control apparatus according to claim 1, wherein
the processing module generates the output data based on a plurality of pieces of the input data.

5. The session control apparatus according to claim 1, wherein
the processing module and the device that outputs the input data to the processing module are comprised in a virtual sensor.

6. A session control apparatus for controlling a session between a processing module and a storage storing a plurality of data sets to be input into the processing module, each data set of the plurality of data sets including a plurality of pieces of data, the session control apparatus comprising a processor configured with a program to perform operations comprising:

operation as the processing module configured to generate, based on at least one piece of input data, output data different from the at least one piece of input data, the at least one piece of input data including input metadata comprising a basic attribute defining the basic attributes of the at least one piece of data and a quality attribute defining a quality of the at least one piece of input data, and to store processing metadata comprising a basic condition required by the processing module and a defined condition regarding a quality of the at least one piece of input data required by the processing module in a processing metadata database;

operation as a matching unit configured to extract a plurality of data set candidates from the stored plurality of data sets based on determining that the input metadata of each of the data set candidates have the basic attribute and the quality attribute thereof satisfying the basic condition and the defined condition of the processing metadata;

operation as a metadata check unit configured to check the quality of current input data from a current data set by:
obtaining from the processing metadata database processing metadata for a port on which the input data is received; and
determining whether the basic attribute and the quality attribute of the current input data comprised in the input metadata included in the current input data satisfies the basic condition and the defined condition of the processing metadata;

operation as an accident check unit configured to determine whether the input metadata included in the current input data indicates that the current input data has had an accident;

operation as an input data set candidate selection unit configured to select at least one data set from the plurality of data set candidates in response to the input metadata included in the current input data not satisfying the basic condition and the defined condition of the processing metadata or indicating that the current input data has had an accident; and operation as a session switching unit configured to switch the data set to be input into the processing module from the current data set to the at least one data set selected by the input data set candidate selection unit, wherein data included in each of the plurality of data set candidates satisfies the basic condition and the defined condition of the processing metadata, and the defined condition comprises at least one of: an outlier condition; a data dropout frequency condition; and a manufacturer condition.

7. A session control method for controlling a session between a processing module and a device, from among a plurality of devices, that outputs input data to the processing module, the processing module being configured to generate, based on at least one piece of the input data, output data different from the at least one piece of input data, the input data generated by each of the plurality of devices including input metadata comprising a basic attribute defining the respective device and a quality attribute defining a quality of the input data output from the respective device, the processing module storing processing metadata comprising a basic condition required by the processing module and a defined condition regarding a quality of the input data required by the processing module in a processing metadata database, the session control method comprising:

extracting a plurality of input device candidates from among the plurality of devices based on determining that device metadata of each of the input device candidates obtained from a device metadata database have the basic attribute and the quality attribute thereof satisfying the basic condition and the defined condition of the processing metadata;

checking the quality of current input data output from a current device to the processing module by:
　obtaining from the processing metadata database processing metadata for a port on which the input data is received; and
　determining whether the basic attribute and the quality attribute of the current input data comprised in the input metadata included in the current input data satisfies the basic condition and the defined condition of the processing metadata;

determining whether the input metadata included in the current input data indicates that the current input data has had an accident;

selecting at least one of the plurality of input device candidates in response to the input metadata included in the current input data not satisfying the basic condition and the defined condition of the processing metadata or indicating that the current input data has had an accident; and switching the device that outputs the input data to the processing module to the selected at least one of the plurality of input device candidates, wherein each of the plurality of input device candidates outputs input data satisfying the basic condition and the defined condition of the processing metadata, and the defined condition comprises at least one of: an outlier condition; a data dropout frequency condition; and a manufacturer condition.

8. A non-transitory computer-readable storage medium storing a program, which, when read and executed, causes a computer to perform operations for controlling a session between a processing module and a device, from among a plurality of devices, that outputs input data to the processing module, the processing module being configured to generate, based on at least one piece of the input data, output data different from the at least one piece of input data, the input data generated by each of the plurality of devices including input metadata comprising a basic attribute defining the respective device and a quality attribute defining a quality of the input data output from the respective device, the processing module storing processing metadata comprising a basic condition required by the processing module and a defined condition regarding a quality of the input data required by the processing module in a processing metadata database, the program, which when read and executed, causes the computer to perform operations comprising:

extracting a plurality of input device candidates from among the plurality of devices based on determining that device metadata of each of the input device candidates obtained from a device metadata database have the basic attribute and the quality attribute thereof satisfying the basic condition and the defined condition of the processing metadata;

checking the quality of current input data output from a current device to the processing module by:
　obtaining from the processing metadata database processing metadata for a port on which the input data is received; and
　determining whether the basic attribute and the quality attribute of the current input data comprised in the input metadata included in the current input data satisfies the basic condition and the defined condition of the processing metadata;

determining whether the input metadata included in the current input data indicates that the current input data has had an accident;

selecting at least one of the plurality of input device candidates in response to the input metadata included in the current input data not satisfying the basic condition and the defined condition of the processing metadata or indicating that the current input data has had an accident; and switching the device that outputs the input data to the processing module to the selected at least one of the plurality of input device candidates, wherein each of the plurality of input device candidates outputs input data satisfying the basic condition and the defined condition of the processing metadata, and the defined condition comprises at least one of: an outlier condition; a data dropout frequency condition; and a manufacturer condition.

9. The session control apparatus according to claim 2, wherein
the devices comprise sensors, and
the input data comprises sensing data generated by the sensors.

10. The session control apparatus according to claim 2, wherein the processor is configured with the program such that operation as the processing module comprises generating the output data based on a plurality of pieces of the input data.

11. The session control apparatus according to claim 2, wherein the processing module and the device that outputs the input data to the processing module are comprised in a virtual sensor.

12. The session control apparatus according to claim 3, wherein the processor is configured with the program such that operation as the processing module comprises generating the output data based on a plurality of pieces of the input data.

13. The session control apparatus according to claim 3, wherein the processing module and the device that outputs the input data to the processing module are comprised in a virtual sensor.

14. The session control apparatus according to claim 4, wherein the processing module and the device that outputs the input data to the processing module are comprised in a virtual sensor.

* * * * *